(12) United States Patent
Punjabi

(10) Patent No.: US 7,372,810 B2
(45) Date of Patent: May 13, 2008

(54) SELF MANAGING DIRECTORY SERVICE FOR VOICE OVER IP NETWORKS

(75) Inventor: Anil Punjabi, San Jose, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 874 days.

(21) Appl. No.: 10/173,471

(22) Filed: Jun. 14, 2002

(65) Prior Publication Data

US 2003/0231618 A1 Dec. 18, 2003

(51) Int. Cl.
*H04J 1/16* (2006.01)
*H04L 12/66* (2006.01)
*H04L 12/28* (2006.01)

(52) U.S. Cl. .................. 370/230; 370/352; 370/401

(58) Field of Classification Search .................. None
See application file for complete search history.

(56) References Cited

U.S. PATENT DOCUMENTS

| | | | |
|---|---|---|---|
| 5,509,058 A | | 4/1996 | Sestak et al. |
| 5,887,127 A | * | 3/1999 | Saito et al. ................. 714/4 |
| 6,308,061 B1 | | 10/2001 | Criss et al. |
| 6,466,977 B1 | * | 10/2002 | Sitaraman et al. ........ 709/225 |
| 6,560,654 B1 | * | 5/2003 | Fedyk et al. ............... 709/239 |
| 6,591,301 B1 | * | 7/2003 | Li et al. .................. 709/229 |
| 6,625,119 B1 | * | 9/2003 | Schuster et al. .......... 370/230 |
| 6,650,619 B1 | * | 11/2003 | Schuster et al. .......... 370/230 |
| 6,711,152 B1 | * | 3/2004 | Kalmanek et al. ........ 370/351 |
| 6,775,253 B1 | * | 8/2004 | Agrawal et al. ........... 370/329 |
| 6,788,648 B1 | * | 9/2004 | Peterson .................. 370/252 |
| 6,795,400 B1 | * | 9/2004 | Schick ..................... 370/236 |
| 6,795,867 B1 | * | 9/2004 | Ma et al. .................. 709/240 |
| 6,920,107 B1 | * | 7/2005 | Qureshi et al. ........... 370/230 |
| 2002/0015383 A1 | | 2/2002 | Ueno |
| 2003/0037165 A1 | * | 2/2003 | Shinomiya ............... 709/238 |
| 2004/0228328 A1 | * | 11/2004 | Potter et al. .............. 370/352 |

FOREIGN PATENT DOCUMENTS

| | | |
|---|---|---|
| WO | WO 00/75744 | 12/2000 |
| WO | WO 01/20846 | 3/2001 |

OTHER PUBLICATIONS

Digital Audio-Video Council, "Non Physical Layer Aspects for Communicative Services—Baseline document 53," Jul. 19, 2001, pp. 1-20, XP002263108.
Polyzois, C. et al., "From POTS to PANS: A Commentary on the Evolution to Internet Telephony," IEEE Network, May 1999, pp. 58-64, vol. 13, No. 3, New York, US. XP000870632.

\* cited by examiner

*Primary Examiner*—Andrew C. Lee

(57) ABSTRACT

A telecommunications system includes a network (101); a plurality of endpoints (102a, 102b) operably coupled to the network; a gatekeeper and a database engine, typically located in a gatekeeper server (108), for downloading database information such as a corporate directory, to the endpoints. The gatekeeper server and the endpoints further include load monitors (2002) for monitoring device performance. If the load is higher than a threshold, the gatekeeper will not provide a requested database information. The endpoint then requests the information from another endpoint.

18 Claims, 2 Drawing Sheets

SELF MANAGING DIRECTORY SERVICE FOR VOICE OVER IP NETWORKS

BACKGROUND OF THE INVENTION

The present invention relates to telecommunications systems and, in particular, to an improved system and method for voice-over-IP system management.

Historically, computer networks were used to carry only data information between separate computing devices. Today's computer networks are increasingly being used to carry computer data, video, audio, and telephony information.

The ITU Recommendation H.323 defines a Voice-over-IP packet-based multimedia communications system. Components of an H.323 system include endpoints, gatekeepers, gateways, and multipoint conference units. Endpoints include personal computers having IP telephony capability, IP telephones, and other devices. Gatekeepers function as VoIP private branch exchanges, setting up calls and handling various administrative functions. Gateways interface the VoIP network to external networks, such as the public switched telephone network (PSTN). Multipoint conference units function during multicast conferencing. While defined having separate functionality, the gatekeepers, gateways, and multipoint control units can also be embodied in a single server.

As noted, the gatekeeper functions to facilitate communication among the endpoints and other network devices. In particular, the gatekeeper functions as a routing and authentication agent. A database engine typically also runs on the same server and provides database services, such as corporate directory loading, call and error logging, and the like. In operation, when a client endpoint registers with the gatekeeper, the client downloads the corporate directory from the gatekeeper. The endpoint can then use the corporate directory information during calls.

As can be appreciated, this adds to the processing load on the server. This can particularly affect the server's performance during peak times. As a worst case, this can bring the entire H.323 system to a halt.

As such, there is a need for an improved system and method for an endpoint downloading database information, such as a corporate directory. There is a further need for an improved system and method for downloading database information without affecting gatekeeper performance.

SUMMARY OF THE INVENTION

These and other problems in the prior art are overcome in large part by a system and method according to the present invention.

A telecommunications system according to an embodiment of the present invention includes a network; a plurality of endpoints operably coupled to the network; a gatekeeper and a database engine, typically located in a gatekeeper server, for downloading database information such as a corporate directory, to the endpoints. The gatekeeper server and the endpoints further include load monitors for monitoring device performance. If the load is higher than a threshold, the gatekeeper will not provide a requested database information. The endpoint then requests the information from another endpoint.

In operation, the gatekeeper receives a request for the corporate directory. The load monitor determines if load on the gatekeeper is above a threshold. If so, the gatekeeper denies the request. The endpoint then sends a broadcast request to other parties on the network for the corporate directory. The other endpoints receive the request, and check their own load monitors. An available endpoint then provides its copy of the corporate directory to the requesting endpoint.

A better understanding of the invention is obtained when the following detailed description is considered in conjunction with the following drawings.

DETAILED DESCRIPTION OF SPECIFIC EMBODIMENTS

Figure 1:
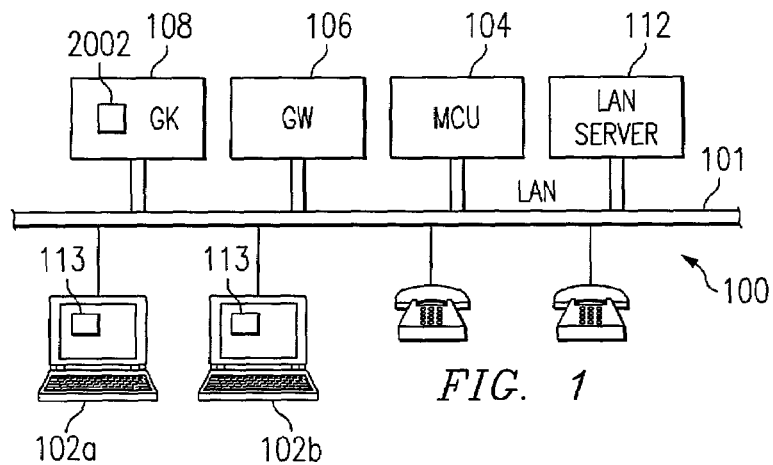
FIG. 1 is a block diagram of an exemplary telecommunications system according to an embodiment of the present invention.

Turning now to the drawings, and with particular attention to FIG. 1, a diagram illustrating an exemplary H.323 telecommunications system 100 according to an embodiment of the present invention is shown. It is noted that, while described herein with regard to an H.323 network, the invention is equally applicable networks such as MGCP (Media Gateway Control Protocol), SIP+ (Inter MGS Protocol), SGCP, MEGACO, and generally, any voice or multimedia over IP scheme. Further, it is noted that, while described specifically in the context of voice packets, the present invention encompasses the use of any multimedia information, such as video, data, voice, or any combinations thereof. An exemplary generic H.323 system is the HiPath™ 4000 system available from Siemens. It should be noted that H.323 recommendation is an umbrella recommendation that provides for multimedia communications, including telephony-over-LAN communications. The network can include packet-switched Transmission Control Protocol/Internet Protocol (TCP/IP) and Internet Packet Exchange (IPX) over Ethernet, Fast Ethernet and Token Ring networks.

The telecommunications system 100 includes a local area network (LAN) or packet network 101. Coupled to the LAN 101 may be a variety of H.323 terminals 102a, 102b, and a variety of servers, such as a multi-point control unit (MCU) 104, an H.323 gateway 106, an H.323 gatekeeper 108, a LAN server 112, and a plurality of other devices such as personal computers (not shown) and telephony devices. The H.323 terminals 102a, 102b are in compliance with the H.323 Recommendation. Thus, the H.323 terminals 102a, 102b support H.245 control signaling for negotiation of media channel usage, Q.931 (H.225.0) for call signaling and call setup, H.225.0 Registration, Admission and Status (RAS), and RTP/RTCP for sequencing audio and video packets. The H.323 terminals 102a, 102b may further implement audio and video codecs, T.120 data conferencing protocols, and MCU capabilities. Further details concerning the H.323 Recommendation may be obtained from the International Telecommunications Union; the H.323 Recommendation is hereby incorporated by reference in its entirety as if fully set forth herein.

As will be discussed in greater detail below, the gatekeeper 108 includes a load monitor 2002 according to an embodiment of the present invention. The load monitor 2002 monitors server load and, when a database request is received, informs a gatekeeper controller whether the load is above, or is likely to become above, a predetermined threshold. If so, then the gatekeeper 108 returns a request denied or similar signal to the requesting endpoint. Alternatively, the gatekeeper 108 may simply ignore the request. "Load" may refer to processing load, use of memory, or any other desired criteria for judging use of system resources.

Further, the H.323 terminals 102a, 102b include also include load monitors 113, according to the present invention. As will be explained in greater detail below, in operation, the endpoints 102 request gatekeeper access; if the request is refused due to load on the gatekeeper 108, the endpoints 102 will send a request to any listening endpoint. The endpoints that receive the message will check their own load monitors. If their load is sufficiently low, they will respond, providing the database information requested.

Figure 2:
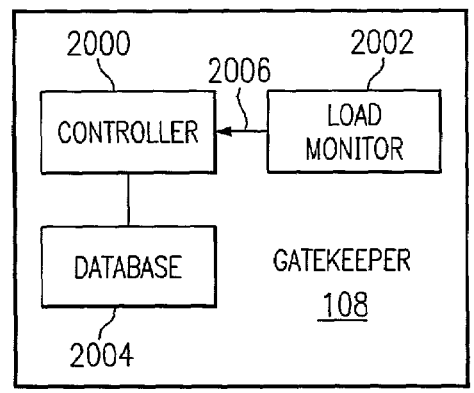
FIG. 2 is a block diagram of an exemplary gatekeeper according to an embodiment of the present invention.

FIG. 2 is a block diagram of an exemplary gatekeeper according to an embodiment of the present invention. As shown, the gatekeeper 108 includes a controller 2000, a load monitor 2002 and a database engine 2004.

The controller 2000 implements Recommendation H.323 gatekeeper services, as will be explained in greater detail below, with reference to the endpoints 102. Briefly, the controller 2000 manages the gatekeeper's interactions with other network devices, including call setup and call signaling. Further, the controller 2000 handles endpoint requests for registration and database access. The load monitor 2002 functions according to embodiments of the present invention to monitor gatekeeper load and to provide a signal or signals 2006 to the controller 2000 when that load has exceeded a predetermined threshold. If the load has exceeded the threshold, then the controller 2000 replies back to endpoint requests indicating the high load on the server. If the load is less, the controller 2000 replies back with an acknowledge signal or signals and sends the database information to the inquiring endpoint.

Figure 3:
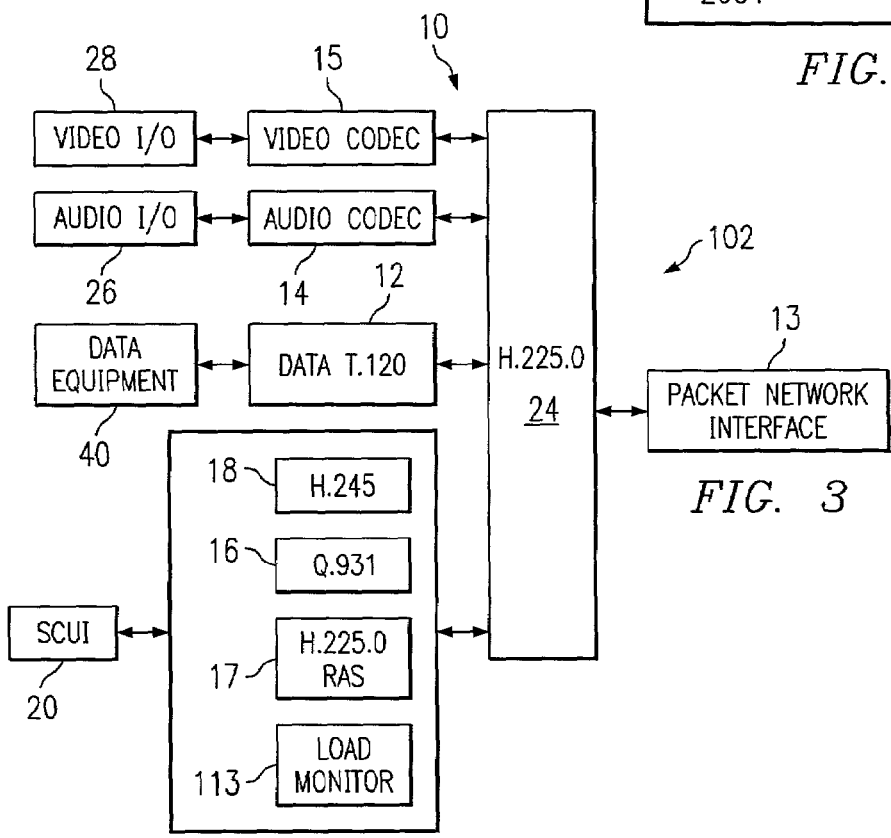
FIG. 3 is a block diagram of an exemplary voice-over-IP terminal according to an embodiment of the present invention.

In accordance with a specific embodiment of the present invention, FIG. 3 illustrates a logical diagram of an H.323 interface, typically present in the endpoints 102a, 102b, to the LAN 101. The interface 10 which may be present in a network terminal 102 includes a load monitoring unit 113 according to the present invention and a packet network interface 13. The network terminal 102 utilizes the ITU-T H.323 Recommendation protocol. The network interface 13 couples the network terminal 102 to the LAN 101. H.323 terminals/devices and equipment carry real-time voice, video and/or data.

The H.323 terminal interface 10 is coupled to a video input/output (I/O) interface 28, an audio I/O interface 212, a data equipment interface 40, and a system control user interface (SCUI) 20. The network terminal 102 further includes an H.225.0 layer 24, an audio coder/decoder (codec) 140 (e.g., implementing G.711, G.728, G.729, G.723.1, G.722), and may include a video codec 15 (e.g., implementing H.261, H.263), and a T.120 data interface layer 19. The audio I/O interface or card 212, which may be part of the standard H.323 device, connects to the audio codec 14, such as a G.711 codec, for encoding and decoding audio signals. The audio codec 14 is coupled to the H.225.0 layer 24. It encodes audio signals for transmission and decodes received signals. Although the G.711 codec is the mandatory audio codec for an H.323 terminal, other audio codecs, such as G.728, G.729, G.723.1, G.722, and MPEG1 audio may also be used for encoding and decoding speech. G.723.1 is a preferred codec because of its reasonably low bit rate, which enables preservation of link bandwidth, particularly in slower speed network connections.

The video I/O interface or card 28, which may be part of the standard H.323 device, connects to a video codec 15, such as an H.261 codec for encoding and decoding video signals. The video codec 15 encodes video signals for transmission and decodes received signals. H.261 is the mandatory codec for H.323 terminals that support video, though other codecs such as H.263 may be supported.

The system control user interface (SCUI) 20 provides signaling and flow control for proper operation of the H.323 terminal 102. In particular, call signaling and control are handled by the SCUI 20. The control layer 111 includes a configuration control unit 113 according to the present invention, but otherwise may be a standard H.323 control layer and thus includes a Q.931 layer 16, H.225.0 RAS layer 17, and H.245 layer 18. Thus, the SCUI 20 interfaces to the H.245 layer 18 which is the media control protocol that allows capability exchange, opening and closing of logical channels, mode preference requests, flow control messages and other miscellaneous commands and indications. The SCUI 20 also interfaces to the Q.931 protocol which defines the setup, teardown, and control of H.323 communication sessions. The SCUI 20 further interfaces to the H.225.0 Registration, Admission and Status (RAS) protocol that defines how H.323 entities can access H.323 gatekeepers to perform, among other things, address translation, thereby allowing H.323 endpoints to locate other H.323 endpoints via an H.323 gatekeeper 108. The H.225.0 layer 24, which is derived from Q.931 layer 16, is the protocol for establishing a connection among two or more terminals and also formats the transmitted video, audio, data, signaling and control streams into messages for communication via the network interface 13 (e.g., packet network 101). The H.225.0 layer 24 also retrieves the received video, audio, data, signaling and control streams from messages that have been input from the network interface, routes the signaling and control information to control layer 11 and routes media streams to the appropriate audio, video and data interfaces.

As noted above, a load monitoring unit 113 according to embodiments of the present invention is adapted to monitor system load and to allow the endpoint to respond to and make database requests of and for the gatekeeper. In operation, the endpoint 102 logs on to the gatekeeper 108 when it turns on. It then requests gatekeeper database information such as the corporate directory. The gatekeeper 108 then checks its load and responds with an acknowledge and the database information if the load is below a threshold. If the load is above the threshold, then the gatekeeper 108 responds with a LOADED signal or, alternatively, ignores the request. The endpoint 102 receives the LOADED signal (or the wait period timer expires) and issues a message on the network requesting the corporate directory information from any available endpoint. For example, the signal may be a UDP broadcast request.

Another endpoint will listen on the network and, upon receiving the request, will check its load status. If the load is sufficiently low, then the endpoint will respond with an acknowledge ACK, including its IP address. The endpoints will then open a channel and exchange the stored corporate directory information.

Figure 4:
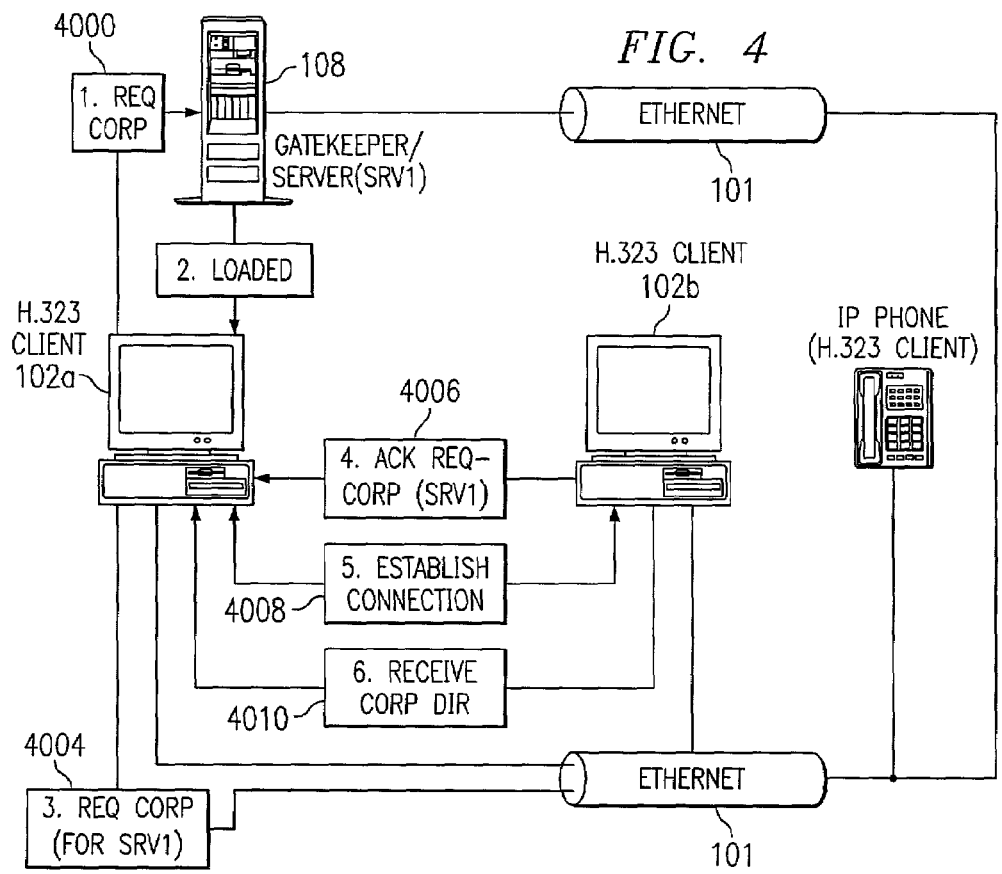
FIG. 4 is a flow diagram illustrating signaling for an embodiment of the present invention.

FIG. 4 is a diagram illustrating operation of an embodiment of the present invention. Shown are a network 101, such as an Ethernet LAN; a gatekeeper 108; and H.323 client endpoints 102a, 102b. Initially, the gatekeeper server 108 and the client endpoints start their load monitors. A client, such as endpoint 102a, logs on to the gatekeeper server 108, such as via a gatekeeper request exchange. At 4000, the endpoint client 102a requests database information, such as the corporate directory. The gatekeeper server 108 checks its load monitor 2002 to determine its load. If the load monitor 2002 determines load is too high, or is likely to become too high, the gatekeeper server 108 will return the gatekeeper loaded message LOADED, at 4002. Alternatively, the gatekeeper 108 may simply ignore the request. In response, the endpoint client 102a will issue a broadcast UDP corporate directory request REQ-CORP to other endpoints on the network 101. In the example illustrated, the client endpoint 102b receives the REQ-CORP signal, and checks its load monitor in response. If its load monitor 113 indicates it has sufficient resources to supply the corporate directory, then the client endpoint 102b replies to the client endpoint 102a with an acknowledge request ACK-REQ signal at 4006. At 4008, the endpoints 102a, 102b establish a signaling connection for communicating the corporate directory. Finally, at 4010, the endpoint 102a receives the corporate directory from the endpoint 102b.

Figure 5:
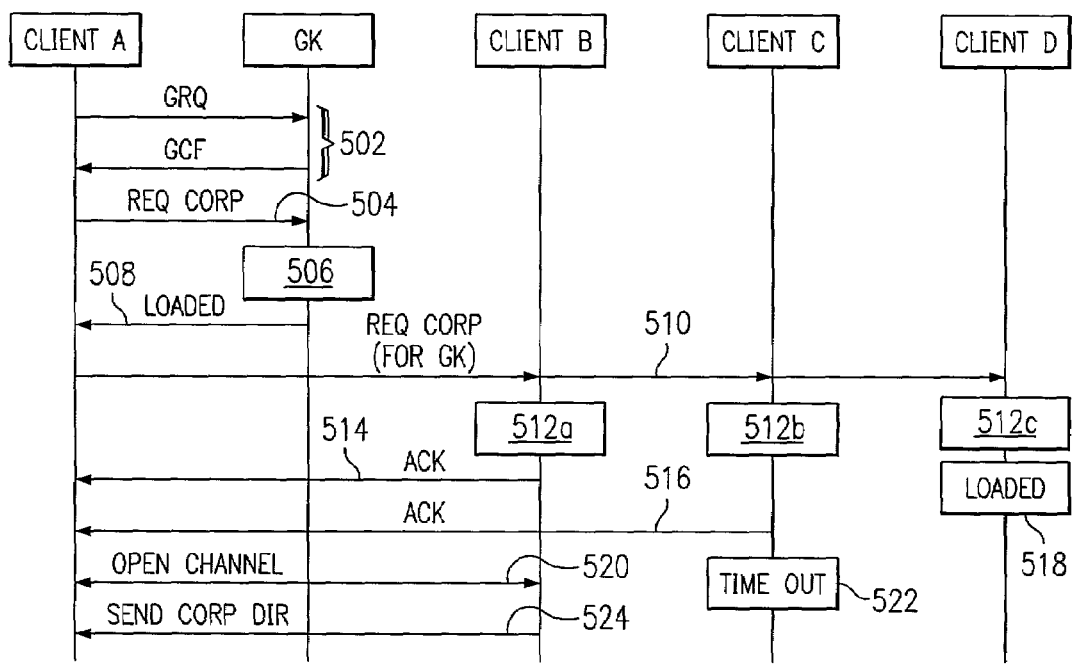
FIG. 5 is a diagram illustrating signaling for operation of an embodiment of the present invention.

Turning now to FIG. 5, a more detailed diagram illustrating signaling according to an embodiment of the present invention is shown. In particular, shown are a gatekeeper GK and client endpoints A, B, C, and D. In the example, illustrated, Client A is logging on; clients B, C, and D are already logged on with the gatekeeper GK. At 502, the Client A undertakes the gatekeeper request/gatekeeper acknowledge (GRQ/GCF) exchange to find the gatekeeper GK. It is noted that in other systems, additional gatekeepers may be provided; in such cases, the Client A and a chosen gatekeeper will undertake a further Registration Request/Registration Confirm (RRQ/RCQ) exchange (not shown).

Once registered with the gatekeeper GK, the endpoint Client A sends a database request, such as a Request Corporate Directory request to the gatekeeper GK, at 504. In response, at 506, the gatekeeper GK queries its load monitor 2002 (FIG. 2) to determine a load on the system. If the load monitor determines that the load on the gatekeeper is above a predetermined threshold, then the gatekeeper GK will return a LOADED signal at 508. In response, the endpoint Client A will broadcast a Request Corporate directory REQ-CORP signal at 510 to other endpoints. Typically, the request will be in a User Datagram Protocol (UDP) format. At 512a, 512b, 512c, the endpoints Client B, C, and D, respectively, check their load monitors 113 (FIG. 3) to determine load.

In the example illustrated, both the endpoints Client B and Client C return an acknowledge ACK at 514, 516, indicating they have sufficient resources to provide the directory. The acknowledge signal ACK may include information such as the IP address of the responding endpoint. At 518, in the example illustrated, the endpoint Client D does nothing, since it has determined load to be too high.

Because more than one endpoint has responded with an acknowledge ACK signal, the endpoint Client A will pick one, using a predetermined criteria. According to one embodiment, the endpoint Client A will pick the first endpoint that responds. In the example shown, this is endpoint Client B. Thus, at 520, the endpoint Client A and endpoint Client B undertake to open a channel. This can include, for example, codec negotiation, master-slave determination, and the like. Alternatively, it can be a simple socket connection between two endpoints with authentication based on gatekeeper information. At 522, the endpoint Client C will sit idle, because its acknowledge has timed out. Finally, at 524, the endpoint Client B will send the corporate directory to the endpoint Client A. It is noted that, if no endpoints responded to the REQ-CORP signal, then the endpoint Client A would wait a predetermined period before attempting it again, either from the gatekeeper or the broadcast.

The invention described in the above detailed description is not intended to be limited to the specific form set forth herein, but is intended to cover such alternatives, modifications and equivalents as can reasonably be included within the spirit and scope of the appended claims.

What is claimed is:

1. A telecommunications method, comprising,
monitoring a load on a VoIP gatekeeper;
refusing an endpoint access request from an endpoint if a load is higher than a predetermined threshold;
broadcasting said access request from the endpoint in response to said refusing;
monitoring a load at another endpoint using a local load monitor; and
providing said access from another endpoint if said another endpoint has available capacity as determined by said another endpoint from said local load monitoring and responsive to said access request.

2. A telecommunications method in accordance with claim 1, wherein said another endpoint first determines whether it has available capacity.

3. A telecommunications method in accordance with claim 2, said VoIP gatekeeper comprising an H.323 gatekeeper.

4. A telecommunications method in accordance with claim 3, said access request comprising a network database access.

5. A telecommunications system, comprising:
a packet network;
a plurality of VoIP endpoints coupled to said network;
at least one gatekeeper coupled to the network, said gatekeeper maintaining a network directory downloadable to each of said endpoints on initialization;
wherein at least one of said plurality of VoIP endpoints is configured to provide said network directory to another of said VoIP endpoints responsive to a request from the another if said at least one gatekeeper has a load exceeding a predetermined threshold.

6. A telecommunications system in accordance with claim 5, said at least one gatekeeper including a load monitor.

7. A telecommunications system in accordance with claim 6, wherein said VoIP endpoints include endpoint load monitors.

8. A telecommunications system in accordance with claim 7, wherein, if said at least one gatekeeper has a load exceeding said threshold, said at least one of said VoIP endpoints receives a signal indicative of the loaded condition from said at least one gatekeeper.

9. A telecommunications system in accordance with claim 8, said at least one endpoint transmits a information request to any available others of said VoIP endpoints.

10. A telecommunications endpoint in a system including a plurality of telecommunications endpoints, comprising:
a VoIP controller;
a load monitor; and
a memory for storing system database information;
wherein said VoIP controller is configured to provide said database information to a requesting endpoint responsive to a broadcast request from the requesting endpoint if said load monitor indicates said load is below a predetermined threshold and when a VoIP controller on another device has refused a database information request due to a load being above a predetermined threshold.

11. A telecommunications device, in accordance with claim 10, said telecommunications device comprising an H.323 gatekeeper.

12. A telecommunications device in accordance with claim ID, said telecommunications device comprising an H.323 endpoint.

13. A telecommunications device in accordance with claim 12, said H.323 endpoint adapted to make requests to other endpoints for said database information if a gatekeeper's load exceeds a predetermined threshold.

14. A telecommunications method, comprising:
providing a VoIP controller;
providing a load monitor; and
providing a memory for storing system database information;
wherein said VoIP controller is configured to provide said database information to a requesting endpoint responsive to a broadcast request from the requesting endpoint if said load monitor indicates said load is below a predetermined threshold and when a VoIP controller on another device has refused a database information request due to a load being above a predetermined threshold.

15. A telecommunications method, in accordance with claim 14, said telecommunications device comprising an H.323 gatekeeper.

16. A telecommunications method, in accordance with claim 14, said telecommunications device comprising an H.323 endpoint.

17. A telecommunications method in accordance with claim 16, said H.323 endpoint adapted to make requests to other endpoints for said database information if a gatekeeper's load exceeds a predetermined threshold.

18. A telecommunications system, comprising:
a packet network;
a plurality of VoIP endpoints coupled to said network including load monitors;
at least one gatekeeper coupled to the network, said gatekeeper maintaining a network directory downloadable to each of said endpoints on initialization, said gatekeeper including a load monitor;
wherein at least one of said plurality of VoIP endpoints is configured to provide said network directory to another of said VoIP endpoints responsive to a request from the another and responsive to said at least one monitoring its own load if said at least one gatekeeper has a load exceeding a predetermined threshold as determined by the gatekeeper load monitor.

* * * * *